(12) United States Patent
Kanigicherla et al.

(10) Patent No.: US 9,836,478 B2
(45) Date of Patent: Dec. 5, 2017

(54) FILE SYSTEM SHARING

(75) Inventors: Balaji Kanigicherla, Hyderabad (IN);
Krishna Mohan Tandaboina, Hyderabad (IN); Siva Raghuram Voleti, Hyderabad (IN); Surya Narayana Dommeti, Hyderabad (IN); Sridhar Adusumilli, Hyderabad (IN)

(73) Assignee: Ineda Systems Inc., Santa Clara, CA (US)

( * ) Notice: Subject to any disclaimer, the term of this patent is extended or adjusted under 35 U.S.C. 154(b) by 353 days.

(21) Appl. No.: 14/111,058

(22) PCT Filed: Apr. 9, 2012

(86) PCT No.: PCT/IN2012/000255
§ 371 (c)(1),
(2), (4) Date: Oct. 10, 2013

(87) PCT Pub. No.: WO2012/140671
PCT Pub. Date: Oct. 18, 2012

(65) Prior Publication Data
US 2014/0032601 A1    Jan. 30, 2014

(30) Foreign Application Priority Data
Apr. 11, 2011   (IN) .......................... 1263/CHE/2011

(51) Int. Cl.
G06F 17/30        (2006.01)
(52) U.S. Cl.
CPC .. G06F 17/30194 (2013.01); G06F 17/30165 (2013.01)

(58) Field of Classification Search
CPC .. G06F 9/455; G06F 9/45533; G06F 9/45545; G06F 9/4555; G06F 9/45554;
(Continued)

(56) References Cited

U.S. PATENT DOCUMENTS

2005/0182788 A1* 8/2005 Arndt ................. G06F 9/45533
2006/0106827 A1* 5/2006 Brown ............. G06F 17/30067
(Continued)

FOREIGN PATENT DOCUMENTS

| CN | 101329681 | 12/2008 |
| CN | 101459697 | 6/2009 |
| WO | 2012140671 | 10/2012 |

OTHER PUBLICATIONS

Microsoft, Mount or dismount a drive. Definition of the term "Mount". pp. 1. Printed Nov. 20, 2015; http://windows.microsoft.com/en-us/windows/mount-dismount-drive.*
(Continued)

*Primary Examiner* — Amanda Willis
(74) *Attorney, Agent, or Firm* — Workman Nydegger (57) ABSTRACT

File system sharing in multi-host computing system (100) running multiple operating systems is described herein. A file systems stored on different data partitions (110-1) and (110-1), of different operating systems (106-1) and (106-2), running on a multi-host computing system (100) may be shared based on file server-client architecture. According to the implementation, an operating system (106-1) may share its file system as file server and other operating system (106-2) may access the shared file system as file client. In one implementation, the sharing of data between multiple hosts is enabled by a dedicated high speed, low latency, inter processor communication bus, FiRE (124).

13 Claims, 4 Drawing Sheets

(58) Field of Classification Search
CPC .. G06F 9/45558; G06F 9/45541; G06F 13/24; G06F 13/40
See application file for complete search history.

(56) References Cited

U.S. PATENT DOCUMENTS

2006/0259731 A1* 11/2006 Oshins ................... G06F 9/544
                                                    711/173
2008/0319996 A1    12/2008 Cook
2011/0055299 A1*  3/2011 Phillips ............... G06F 9/45533
                                                    707/827
2013/0151840 A1*  6/2013 Kanigicherla ......... G06F 9/461
                                                    713/100

OTHER PUBLICATIONS

International Search Report and Written Opinion for PCT/IN2012/000255 dated Oct. 18, 2012.

* cited by examiner

FILE SYSTEM SHARING

TECHNICAL FIELD

The present subject matter relates to multi-host computing systems and more specifically to file system sharing in multi-host computing systems running multiple operating systems.

BACKGROUND

Computing systems typically include a combination of hardware and software. The combination of hardware and software on a particular computer system defines a computing environment. Therefore, different hardware platforms and different operating systems provide different computing environments. The different computing systems or the different operating systems, which implement the different computing environments, may sometimes share certain hardware or software resources. Typically, to share file systems of one computing environment stored on a storage media with the different computing systems implementing same or different computing environments, a method of server-client file system sharing is adopted. In this method, an operating system shares its file system over a network and the other operating system may access the shared file system through a network.

With the advances in technology, computing systems can now be configured to run a plurality of operating systems. Executing the plurality of operating systems on a single computing system allows the system to perform multiple functions. The computing system may employ a hypervisor to manage the plurality of operating systems that each execute on the single computing system. While running multiple operating systems on a single computing system, each of the operating systems share the processor, memory, and other resources of the system. Further, each of the operating systems may have different file systems stored in the memory which has logical partitions for each operating system. Many a times, these different operating systems working on the same computing system require sharing of information that may be stored on different file systems.

Typical hypervisor based solutions use a network based file server approach to share the file system stored on logical partitions of local storage devices. Known methods for sharing information between logical partitions typically use a virtual local area network (VLAN). Using VLAN technology, the logical partitions may communicate with each other on connections that appear to be physical network connections, but in reality are virtual network connections between the logical partitions and the operating system. In certain situations, file system sharing between multiple operating systems is also achieved by using shadow volume techniques.

SUMMARY

This summary is provided to introduce concepts related to file system sharing in a multi-host computing system running multiple operating systems that are further described in the detailed description. This summary is not intended to identify essential features of the present subject matter nor is it intended for use in determining or limiting the scope of the present subject matter.

In one implementation, a file systems stored on different data partitions of different operating systems running on a multi-host computing system are shared based on file server-client architecture. According to the implementation, an operating system may share its file system as file server and other operating system may access the shared file system as file client. In one implementation, the sharing of data between multiple hosts is enabled by a high speed inter processor communication bus. In the said implementation, the inter processor communication bus may be a dedicated hardware communication bus capable of performing direct memory access (DMA) functions. The dedicated hardware communication bus is also referred to as a File Redirection Engine (FiRE) hereinafter.

In another implementation, a method for file system sharing in a multi host computing system may include receiving an access request from an operating system from amongst a plurality of operating systems where the plurality of operating systems comprise at least a primary operating system miming on a primary processor and a secondary operating system running on a secondary processor, and the primary operating system is coupled to the secondary operating system through an inter processor communication bus. The method may further include providing the access request to another operating system from amongst the plurality of operating systems, through an inter processor communication bus driver, wherein the access request is indicative of a request to access a file stored in a file system of a native data partition associated with the another operating system, and receiving file handles associated with the file from the another operating system. Further, the method may include providing the file handles associated with the file to the operating system for the operating system to perform read and write operations on the file.

BRIEF DESCRIPTION OF THE DRAWINGS

The detailed description is described with reference to the accompanying figures. In the figures, the left-most digit(s) of a reference number identifies the figure in Which the reference number first appears. The same numbers are used throughout the drawings to reference like features and components.

It should be appreciated by those skilled in the art that any block diagrams herein represent conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

DETAILED DESCRIPTION

Multi-host computing systems running multiple operating systems and methods for file system sharing are described.

These systems and methods can be implemented in a variety of computing systems. The multi-host computing systems may implement the described method(s) for the purpose of file system sharing. The multi-host computing systems may include but are not limited to, desktop computers, hand-held devices, laptops or other portable computers, mobile phones, personal digital assistants (PDA's), tablet personal computers, Rebooks, workstations, and the like, which utilize multiple processors on the same hardware platform. In one implementation, the method can also be implemented for systems running any operating system, such as Linux, Unix, Microsoft® Windows®, Mac OS X®, Android, and the like. Although the description herein is with reference to certain multi-host computing systems running particular operating systems, the systems and methods may be implemented in other operating systems and computing systems, albeit with a few variations, as will be understood by a person skilled in the art.

Multiple operating systems are typically used to perform different functions on the same hardware platform. Each operating system may provide a particular advantage over different operating systems (OS). For example, in a multi-host computing system, which may run two different operating systems, for example, OS1 and OS2, the OS1 may provide better performance or support more applications than the OS2. However, the OS2 may consume less resource, such as memory, processing power, and battery power when compared to the OS1. In such a scenario, the computing system may implement the OS1 for application processing and computational purposes whereas the computing system may implement the OS2 during an idle state or when miming on battery.

To implement multiple operating systems on a single host computing system, hypervisors are typically utilized. Hypervisors allow multiple operating systems to run concurrently on the computing system utilizing the same hardware resources. Such hypervisors which run on computing system, such as desktop, laptops or mobile devices, do not provide access of the storage device to all the running operating systems simultaneously. Typically, to share the storage device between different operating systems, the one operating system acts as a server and provides the storage device access to other operating systems acting as clients.

Different operating systems may store data on different file systems, and at times it may be desirable for operating systems to share their file system, thereby allowing two different OS to access the same file(s). Typically, this is achieved by use of a virtual local area network (VLAN). However, sharing a file system through VLAN not only introduces significant processing overhead in the form of virtual network traffic but also requires a software stack to support communications protocol. Further, the use of the virtual network may only provide throughput to a level that may not be sufficient for smooth and seamless sharing of bulky and huge files such as High Definition (HD) videos. Also, the use of the virtual network often requires a manual setup of the server and the client, which may require knowledge of file systems and system administration.

Typically, in certain situations, file system sharing on computing systems implementing multiple operating systems is achieved by the use of shadow volume technique. Generally, the shadow volume technique allows sharing of a shared partition of the storage device by a method of creating a shadow partition. During instances when multiple operating systems are active on the computing system, a single primary OS mounts a storage device for read and write operations, where the storage device is also shared among multiple operating systems, such as a secondary operating system. The secondary operating system, to share the storage device, shall mount the partition in read-only mode. In such situations of file system sharing, changes that occur on the files accessed by the secondary operating systems are written to the shadow partition. Further, these changes need to be synchronized with the original partitioned portion with the help of a sync application.

According to an embodiment of the present subject matter, systems and methods for file system sharing in a multi-host computing system running multiple operating systems is described. In one embodiment, a multi-host computing systems may include but are not limited to, desktop computers, hand-held devices, laptops or other portable computers, mobile phones, personal digital assistants (PDA's), tablet personal computers, netbooks, workstations, and the like, which utilize multiple processors on the same hardware platform. In said embodiment, the method can also be implemented for systems mining different operating systems, such as Linux, Unix, Microsoft® Windows®, Mac OS X®, Android, and the like. Although the description herein is with reference to certain multi-host computing systems running particular operating systems, the systems and methods may very well be implemented in other operating systems and computing systems.

The methods as described in the present subject matter, on one hand, allows file system sharing between operating systems that are always active, and on the other hand, allows file system sharing between operating systems running different power management schemes. Thereby, providing an efficient and convenient method to share the file system between logical partitions where multiple operating systems are allowed to read-write the files on the same storage device partition.

The described method(s) allow(s) sharing of different file systems installed on storage devices between Multiple Active Operating Systems (MAOS) running on the same hardware platform. With the capability of simultaneous device access, and high-speed data and command transfers over a dedicated bus, applications running on different operating systems may share a file system to read-write the files on the shared file system.

In one embodiment, a multi-host computing system may provide a hardware platform that supports simultaneous access to the storage devices, such as hard disk drives, solid state drives, or the like. The storage device may contain different boot and data partitions for different operating systems running on separate processors and accessing the storage device. The boot partition and data partition of each operating system is also referred to as native boot partition and native data partition of the operating system hereinafter. In one embodiment, the file system on the native data partition of an operating system may be shared between multiple operating systems running on the multi-host computing system based on server-client file sharing architecture. In another embodiment, the file system between two operating systems running on the multi-host computing system may be shared based on the shadow volume techniques.

In a multi-host computing system supporting simultaneous access to the storage device, operating systems may boot from their respective native boot partitions. The native data partition of each of the operating systems can be shared based on server-client sharing architecture where a primary operating system may export its file system acting as the file server, and other secondary operating system(s) may access the file system of the primary operating system as clients.

In one embodiment, the communication between the file server and the file client in a server-client architecture occurs with the use of a dedicated inter processor communication (IPC) bus. In said embodiment, the dedicated IPC bus is a File Redirection Engine (FiRE) which may provide high speed communication between different processors running either similar operating, systems, or different operating systems on a common hardware platform. FiRE may provide high bandwidth, dedicated and lossless channel between multiple processors, which may optimize error recovery and network latency. With the use of FiRE, the file server and file client can communicate without any networking protocol overhead, and may achieve high speed data transfers.

In said embodiment, to share a file system in a multi host computing system, the FiRE may receive an access request from an operating system from amongst multiple operating systems where operating systems are running on different host processors of the multi host computing system, and the operating systems are coupled to each other through the FiRE. The access request received by the FiRE from the operating system is indicative of a request to access a file stored in a file system of a native data partition associated with an another operating system. The FiRE may also provide the access request to the another operating system. In response to the access request, the FiRE may receive file handles associated with the file from the another operating system and may provide the file handles associated with the file to the operating system for performing read and write operations on the file.

In another embodiment, file system sharing between multiple operating systems miming on a multi-host computing system, supporting simultaneous access to the storage device, may share the data partition of other operating systems through sync and replay technique. In said embodiment, the data partition of a primary operating system may be mounted onto other secondary operating systems, but in Read-only mode. The file operations successfully completed by the secondary operating systems on the data partition of the primary operating system can be temporarily stored locally and later replayed on the data partition of the primary operating system. The said embodiment may provide efficient file system sharing between multiple hosts in scenarios where the primary operating system may implement different power management schemes than the secondary operating systems and may transit into a low power state without notifying the secondary operating systems.

It would be appreciated by those skilled in the art that the file system sharing achieved using different techniques described can be implemented for different file systems, such as File Allocation Table (FAT), New Technology File System (NTFS), Hierarchical File System (HFS), High Performance File System (HPFS), Second Extended File System (ext2), Universal Disk Format (UDF), and the like.

It should be noted that the description merely illustrates the principles of the present subject matter. It will thus be appreciated that those skilled in the art will be able to devise various arrangements that, although not explicitly described herein, embody the principles of the present subject matter and are included within its spirit and scope. Furthermore, all examples recited herein are principally intended expressly to be only for pedagogical purposes to aid the reader in understanding the principles of the present subject matter and the concepts contributed by the inventor(s) to furthering the art, and are to be construed as being without limitation to such specifically recited examples and conditions. Moreover, all statements herein reciting principles, aspects, and embodiments of the present subject matter, as well as specific examples thereof, are intended to encompass equivalents thereof.

Figure 1:
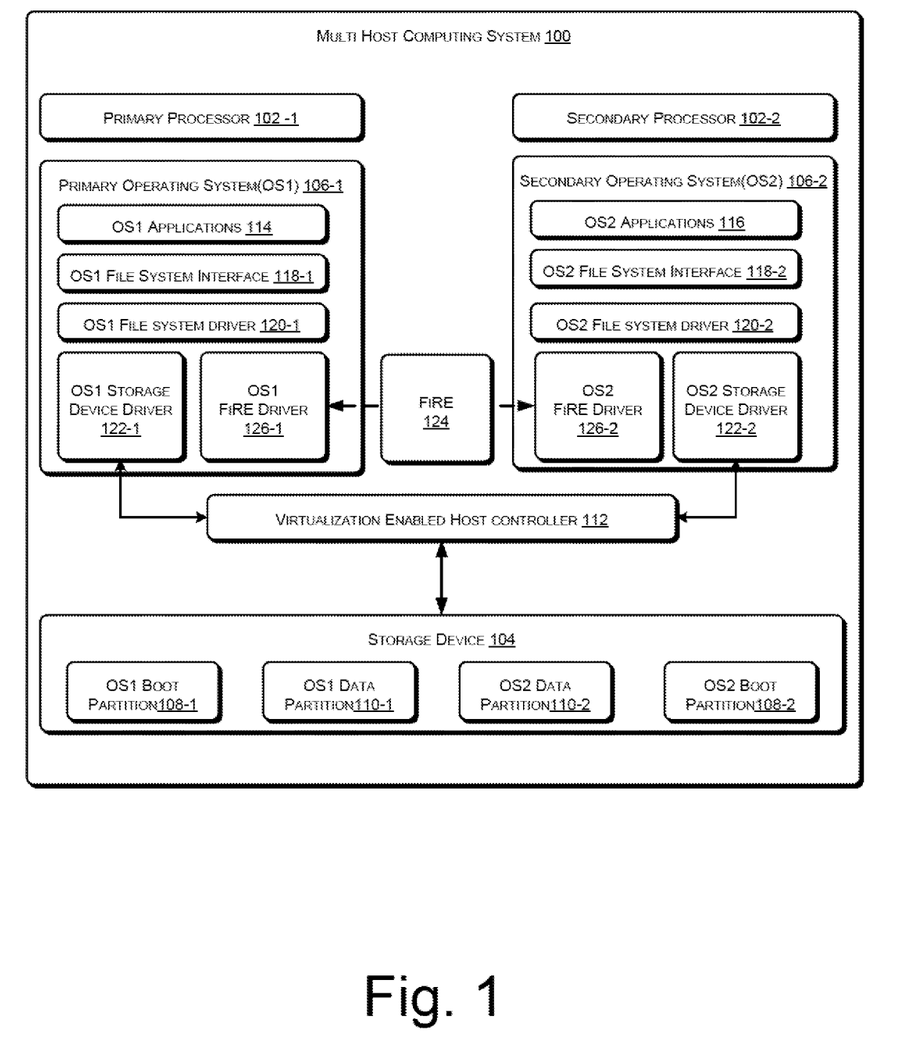
FIG. 1 illustrates an exemplary multi-host computing system implementing a file server-client sharing architecture, in accordance with an embodiment of the present subject matter.
Figure 2:
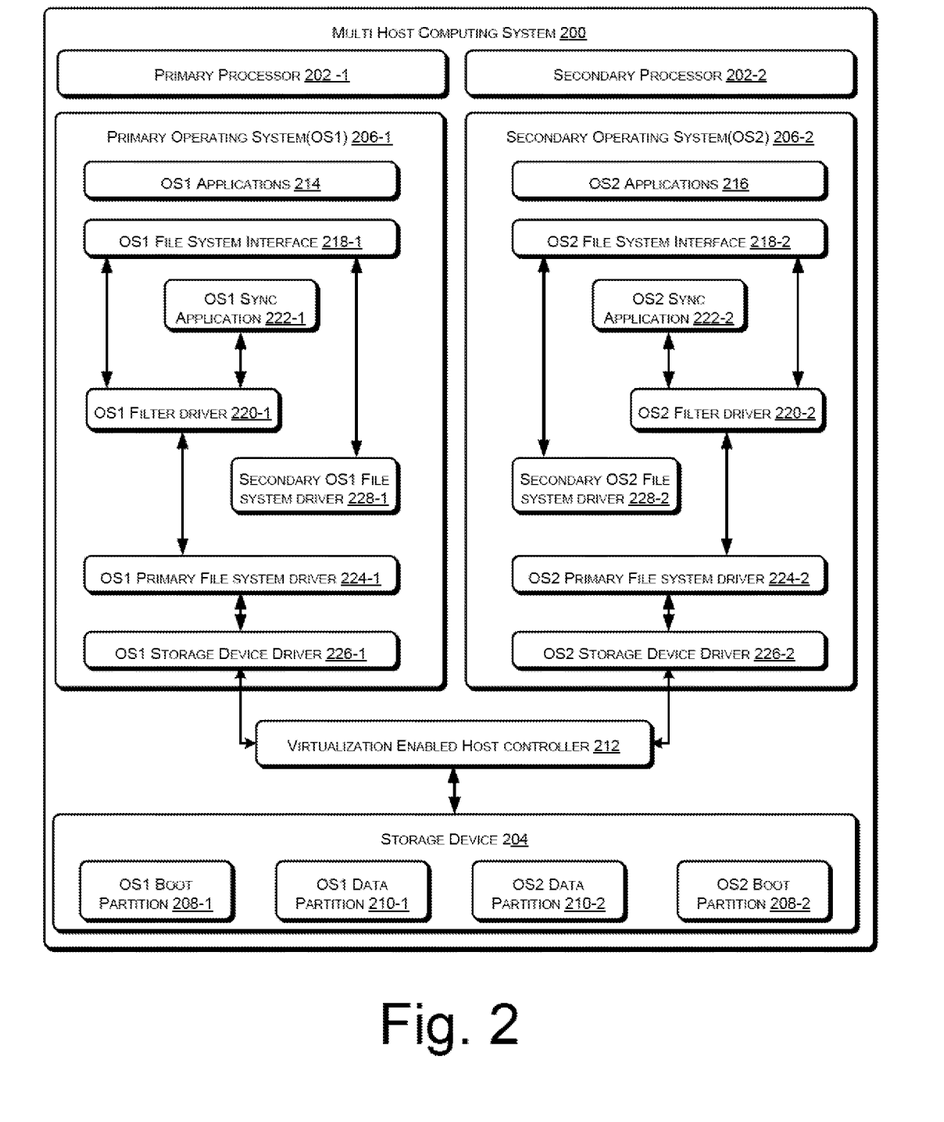
FIG. 2 illustrates an exemplary multi-host computing system implementing file system sharing through sync and replay.
Figure 3:
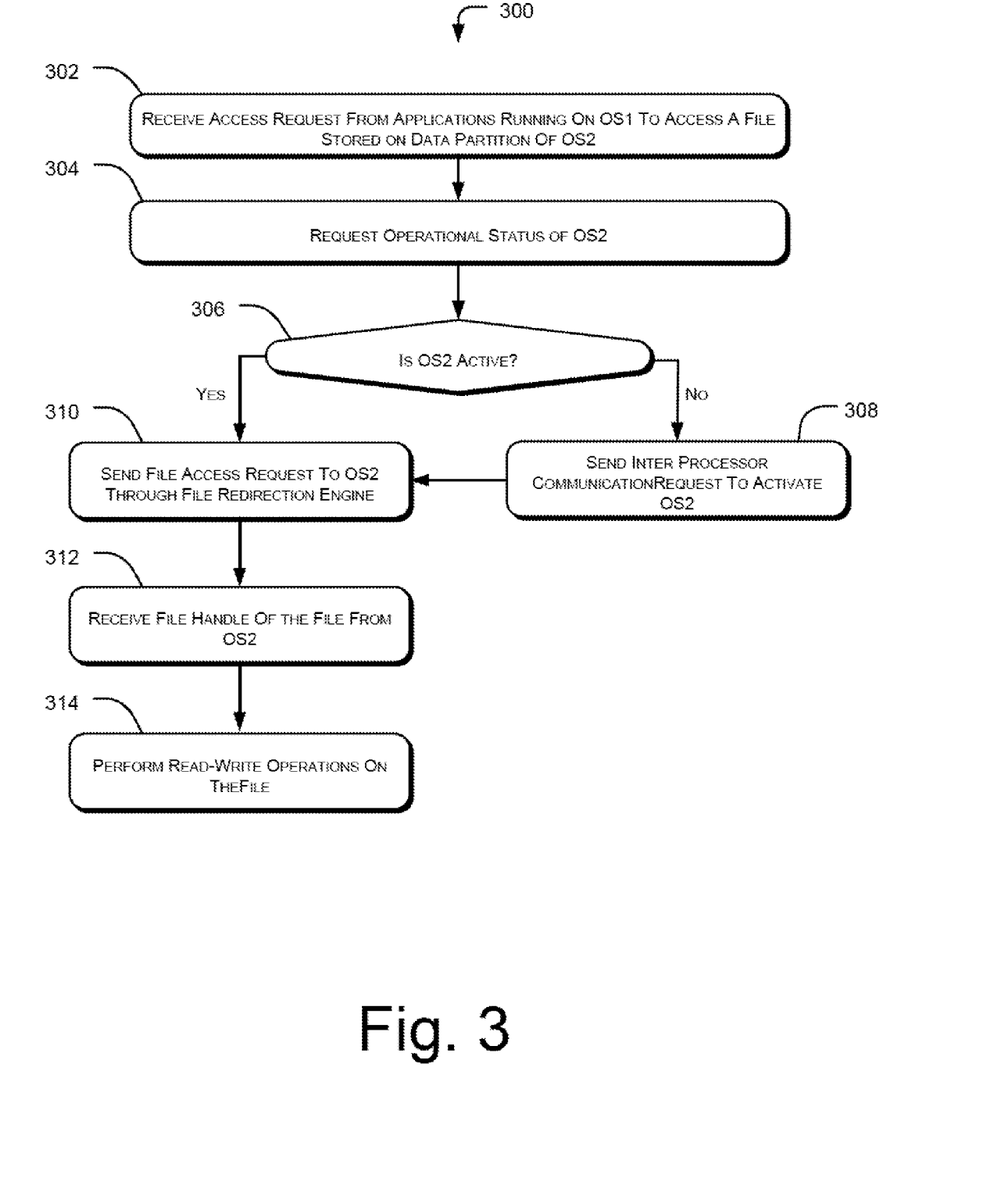
FIG. 3 illustrates a method for file system sharing in a multi-host computing system, in accordance with an embodiment of the present subject matter.

The manner in which the systems and methods for file system sharing are implemented in the multi-host computing system shall be explained in details with respect to the FIGS. 1-3. While aspects of described systems and methods for file system sharing can be implemented in any number of different computing systems, environments, and/or configurations, the embodiments are described in the context of the following exemplary system(s).

Devices that can implement the disclosed system(s) and method(s) include, but are not limited to, desktop computers, hand-held devices, laptops or other portable computers, mobile phones, personal digital assistants (PDA's), tablet personal computers, netbooks, workstations, and the like which utilize multiple processors on the same hardware platform.

It will also be appreciated by those skilled in the art that the words during, while, and when as used herein are not exact terms that mean an action takes place instantly upon an initiating action but that there may be some small but reasonable delay, such as a propagation delay, between the initial action and the reaction that is initiated by the initial action. Additionally, the word "connected" is used throughout for clarity of the description and can include either a direct connection of an indirect connection.

FIG. 1 illustrates a multi-host computing system 100 utilizing two processors viz, a primary processor 102-1 and a secondary processor 102-2 and implementing file system sharing based on file server-client architecture, according to an embodiment of the present subject matter. In said embodiment, the multi-host computing system 100 includes two processors, the primary processor 102-1 and the secondary processor 102-2, collectively referred to as processors 102 hereinafter. The processor(s) 102 may be implemented as one or more microprocessors, microcomputers, microcontrollers, digital signal processors, central processing units, state machines, logic circuitries, and/or any devices that manipulate signals based on operational instructions. Among other capabilities, the processor(s) 102 are configured to fetch and execute operating systems stored in a storage device 104.

The functions of the various elements shown in the figures, including any functional blocks labeled as "processor(s)", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non volatile storage. Other hardware, conventional and/or custom, may also be included.

The processors 102 may run operating systems residing in the respective boot partitions, stored in logically different partitions within the storage device 104. In one implementation, the processors 102 may run two different operating systems, viz, a primary operating system (OS1) 106-1 and a secondary operating system (OS2) 106-2, collectively referred to as operating system(s) 106 hereinafter. According to said implementation, the primary processor 102-1 may execute the primary operating system 106-1 and the secondary processor 102-2 may execute the secondary operating system 106-2.

The primary and secondary operating systems 106-1 and 106-2 may have their respective boot partition stored in different logical partitions on the storage device 104. For example, the OS1 106-1 may have the boot partition stored in an OS1 boot partition 108-1, and similarly the OS2 106-2 may have the boot partition stored in the OS2 boot partition 108-2. The respective operating systems 106 may also store their respective data partitions in the storage device 104. For example, the data partition of OS1 106-1 may be stored in an OS1 data partition 110-1, and the data partition of the OS2 106-2 may be stored in an OS2 data partition 110-2. Hereinafter, the OS1 data partition 110-1 and the OS2 data partition 110-2 may be collectively referred to as the data partition(s) 110. The OS1 data partition 110-1 and the OS2 data partition 110-2 may contain a home directory and default storage areas for applications specific to the OS1 106-1 and the OS2 106-2 respectively.

In one implementation, a common storage device 104 may be shared between the different processors 102 through a virtualization enabled host controller 112. The virtualization enabled host controller 112 may provide a platform, Which would support simultaneous access of the storage device 104, such as a hard disk drive, a solid state drive, or the like. Although the simultaneous access of the storage device 104 has been shown in reference to two hosts, i.e., processors 102-1 and 102-2, it would be understood that the virtualization enabled host controller 112 may allow simultaneous access of the storage device 104 between multiple hosts.

In one implementation, the OS1 106-1 may include applications running on the OS1 106-1, such as OS1 applications 114 and the OS2 106-2 may include applications running on the OS2 106-2, such as OS2 applications 116. Additionally, each of the operating systems 106, may have their own file system interface 118-1 and 118-2 respectively (collectively referred to as file system interface 118 hereinafter), configured to act as an interface between the applications running on the operating system 106 and an underlying file system driver, such as an OS1 file system driver 120-1 and an OS2 file system driver 120-1 (collectively referred to as file system drivers 120 hereinafter). In said embodiment, the file system interface 118 may direct the file system access requests from different applications to the respective file system drivers 120.

The file system drivers 120 allow the applications requests to interact with the data stored in the storage device 104 in the particular file system. It would be understood that for different file systems, such as FAT, NTFS, HFS, HPFS, ext2, and UDF, the operating systems 106 would implement different file system drivers. Further, each of the operating systems 106 would include a storage device driver to interact with a storage device host controller. In one embodiment, the OS1 106-1 includes an OS1 storage device driver 122-1 and the OS2 106-2 includes an OS2 storage device driver 122-2 to interact with the virtualization enabled host controller 112.

In one implementation, the multi-host computing system 100 for file system sharing utilizes a server-client file sharing architecture. In said implementation, the primary and secondary operating systems 106-1 and 106-2 may communicate with each other using the IPC bus. A file Redirection Engine (FiRE) may provide high speed, lossless communication path between multiple processors (102). In one embodiment, the IPC bus may be a file redirection engine 124. The FiRE 124 may provide the high speed communication interface between the two processors 102 running the two operating systems 106. Further, to enable communication over the dedicated high speed low latency FiRE 124 in a pre-determined protocol, each primary and secondary operating system 106-1 and 106-2 includes OS1 and OS2 FiRE drivers 126-1 and 126-2 respectively.

The OS1 106-1 has access to the OS1 boot partition 108-1 and OS1 data partition 110-1. Similarly, the OS2 106-2 has access to the OS2 boot partition 108-2 and OS2 data partition 110-2. For the OS1 106-1 to access the OS2 data partition 110-2 and the OS2 106-2 to access the OS1 data partition 110-1, the operating systems 106 act as file server and clients. The FiRE 124 may be utilized for file system sharing between the Multiple Active Operating Systems (MAOS).

In one implementation, the OS1 applications 114 may access the files stored on the OS2 data partition 110-2. As would be understood by those skilled in the art, operating systems utilize file handles associated with different files to perform actions, such as access, read, and write actions. For the successful communication and transfer of file handles between the two processors 102, the operating system requesting a file from the other operating systems data partition, acts as a file client, and the operating system providing the file handle, acts as a file server.

In working, when an application amongst the OS1 applications 114 running on the OS1 106-1 tries to access a file in the OS2 data partition 110-2, the OS1 file system interface 118-1 would direct the request to the OS1 FiRE driver 126-1. In said implementation, the OS1 106-1 may act as file client. The OS1 FiRE driver 126-2 may then communicate with the OS2 106-2, which may act as file server, and request for the file from file system interface 118-2. The communication between the file client OS1 106-1 and file server OS2 106-2 may occur through the FiRE 124. Further, the file system interface 118-2 of the OS2 106-2 may read the requested file into its local cache and return the file handle to the OS1 file system interface 118-1. This would allow the OS1 106-1 to access the file and perform read or write operations on the file using the received file handle.

The changes and operations made by the OS1 106-1 on the file are communicated to the file server OS2 106-2 and all the changes are written by the OS2 file system interface 118-2 to the file system present in the OS2 data partition 110-2. In one embodiment of the present subject matter, the file sever-client architecture implementing the FiRE 124 may not only allow file system sharing between the operating systems 106, which always remain active, i.e., MAOS, but also provides mechanism for file system sharing when either of the operating systems 106 is in a low power state. For example, in a scenario where the OS1 106-1 goes into a low power state, but the OS2 106-2 is working in active mode, a file system sharing request from the OS2 106-2 can generate a power state transition request, such as a wake-up request for OS1 106-1. In one implementation, the wake-up request may be generated in a similar manner as a wake-up request provided by any hardware to bring the OS1 106-1 in an active mode.

In a scenario where the OS1 106-1 is active and the OS2 106-2 is in the low power state, such as a standby state or a hibernate state, the OS2 106-2 may be transitioned to the active state to enable the file system sharing. In said scenario, the OS1 106-1 may send a file system sharing request to the OS2. The request is communicated to the OS2 106-2 via the high speed IPC bus FiRE 124. The FiRE driver 126-2 present in the OS2 106-2, upon receiving the file system sharing request, would send a wake-up request to the OS2 106-2 to bring the OS2 106-2 in the active state. Once both the OS1 106-1 and the OS2 106-2 are in the active state, the file system sharing can occur using the earlier described technique.

In one implementation, the file system sharing between multiple operating systems 106 implementing different power management schemes can also be implemented. The file system sharing can be based on file server-client architecture where the one operating system 106 may access the data partition 110 of the other operating system 106 with the help of an IPC bus, such as the high speed bus-FiRE 124.

In said implementation, the operating system 106 transitioning to a low power state can optionally close its running applications and can dismount the file system on its respective data partition 110. The other active operating system 106 can then mount this data partition in RW mode. Therefore, all the changes to files are directly stored on the data partition and file systems of the operating systems 106 running on the low power state can also be shared.

In an implementation, each of the operating systems 106 may include a stackable file system (not shown), which can provide read-write access to the files stored on the data partitions. In one implementation, the stackable file system is a layer of file system which may provide read-write access to the files on the data partition 110 of the other operating systems 106. The stackable file system of one of the operating systems 106 may provide the capability of mapping the file share client's file handle to its own file handle.

For example, if the OS2 application 116 requests to access a file in the OS1 data partition 110-1, the stackable file systems present in the OS2 106-2 directs the requests to File Share Client of the OS2 106-2, which in turn communicates with file share server on the OS1 106-1 via FiRE interface. The file share server may read the file into its local cache (not shown) and may return the file handle of the file to the OS2 106-2. The OS2 applications 116 can access the file stored on the OS2 data partition 110-2, and perform write operations as necessary using this file handle. Further, the server on the OS1 106-1 writes all these changes to the file system on the OS1 data partition 110-1.

However, in scenarios when the OS1 106-1 is transitioning to a low power state, the file share server on the OS1 106-1 may close the active OS1 applications 114 and then dismount the OS1 data partition 110-1. In one implementation, the OS1 106-1 may inform the OS2 stackable file system about the transition and the OS2 106-2 may mount the OS1 data partition 110-1 in read-write mode. In such a scenario, the stackable file system maintains the file handles for all open files and when the file server of the OS1 106-1 yields control to the OS2 106-2 of the OS1 data partition 110-1, maps the open file handles to newly created file handles on the OS2 file system driver 120-2.

In above said scenario, when the OS1 106-1 transits into an active state the file server of the OS1 106-1 waits for the stackable file system on the OS2 106-2 to dismount the OS1 data partition 110-1. The OS1 106-1 then remounts the OS1 data partition 110-1 in read-write mode. The stackable file system on the OS2 106-2 may now remap the file handles to use the file share client to access the files.

It would be understood that any of the operating systems OS1 106-1 or OS2 106-2 running on the multi-host computing system 100 may transit onto the low power state and the other operating systems 106 running on the multi-host computing system 100 may mount the data partition 110 of the transitioning operating system 106.

FIG. 2 illustrates a multi-host computing system 200 utilizing two processors, viz, a primary processor 202-1, and a secondary processor 202-2, collectively referred to as processors 202 or processor 202 hereinafter. The processor(s) 202 may be implemented as one or more microprocessors, microcomputers, microcontrollers, digital signal processors, central processing units, state machines, logic circuitries, and/or any devices that manipulate signals based on operational instructions. Among, other capabilities, the processor(s) 202 are configured to fetch and execute operating systems stored in the storage device 204.

The processors 202 may execute operating systems residing in the respective boot partitions, stored in logically different partitions within the storage device 204. In one implementation, the processors 202 may execute two different operating systems, a primary operating system (OS1) 206-1 and a secondary operating system (OS2) 206-2, collectively referred to as operating system(s) 206 hereinafter. According to said implementation, the primary processor 202-1 may execute the OS1 206-1 and the secondary processor 202-2 may execute the OS2 206-2.

The operating systems 206 may have their respective boot partition stored in different logical partitions on the storage device 204. For example, the OS1 206-1 may have the boot partition stored in the OS1 boot partition 208-1, and similarly the OS2 206-2 may have the boot partition stored in the OS2 boot partition 208-2. Hereinafter, the operating system boot partitions 208-1 and 208-2 may collectively be referred to as the hoot partition(s) 208. The respective operating systems 206 may also store their respective data partitions in the storage device 204. For example, the data partition of the OS1 206-1 may be stored in an OS1 data partition 210-1, and the data partition of the OS2 206-2 may be stored in an OS2 data partition 210-2. The OS1 data partition 210-1 and the OS2 data partition 210-2 may contain the home directory and default storage areas for applications specific to the OS1 206-1 and the OS2 206-2 respectively. In one embodiment, the operating systems 206 may also include applications running on operating systems, file system interface 218-1 and 218-2, filter driver 220-1 and 220-2, and sync applications 222-1 and 222-2.

It would be appreciated by those skilled in the art that the common storage device 204 may be shared between two different processors, 202-1 and 202-2 through a virtualization enabled host controller 212. The virtualization enabled host controller 212 is similar to the virtualization enabled host controller 112 as explained in FIG. 1. Further, in one implementation, the applications running on the operating systems 206, such as OS1 application 214 and OS2 application 216, the file system interfaces 218-1 and 218-2, the file system drivers 224-1 and 224-2, and the storage device drivers 226-1 and 226-2 are similar to the applications 114 and 116, the file system interfaces 118-1 and 118-2, the file system drivers 120-1 and 120-2 and the storage device drivers 122-1 and 122-1 respectively, as explained for the multi-host computing system 100 in FIG. 1.

Although, each of the operating systems 206 has mounted the OS1 and OS2 data partitions 210-1 and 210-2 respectively, a native data partition of an operating system is accessed through respective file system driver whereas, the data partition of the other operating system is accessed via respective secondary file system driver. For example, for the OS1 206-1, the OS1 data partition 210-1 is accessed via OS1 file system driver 224-1. However, the OS2 data partition 210-2 mounted in read-only mode is accessed via the OS1 secondary file system driver 228-1. Similarly, for the OS2 206-2, the OS2 data partition 210-2 is accessed via the OS2 file system driver 224-2. However, the OS1 data partition 210-1 mounted on read-only mode is accessed via the OS2 secondary file system driver 228-2. The OS1 secondary file system driver 228-1 and the OS2 secondary file system driver 228-2 are commonly referred to as secondary file system driver 228 hereinafter.

In one embodiment, the file system sharing of an operating system may be Shared based on sync and replay technique. In said embodiment, the OS1 206-1 may mount the OS1 boot partition 208-1, the OS1 data partition 210-1 in read-write mode, and may also mount the OS2 data partition 210-2 in read-only mode. Similarly, the OS2 206-2 may mount the OS2 boot partition 208-2, the OS2 data partition 210-2 in read-write mode, and may also mount the OS1 data partition 210-1 in read-only mode.

The secondary file system driver 228 in sync and replay technique can be an UnionFS. The secondary file system driver of an operating system, such as the OS1 secondary file system driver 228-1 of the primary operating system 206-1 can mount the OS2 data partition 210-2 in read only mode but may make it appear to the user as a read-write file system. In one implementation, the secondary operating system 206-2 may be in low power state while the OS1 secondary file system driver 228-1 mounts the OS2 data partition. In such a scenario, the changes made by the user of the primary operating system 206-1 may be stored in the OS1 data partition, local to the primary operating system 206-1. The OS2 sync application 222-1 may then replay the changes made by the user changes in the OS2 data partition with the help of the OS2 primary file system driver 224-2. This sync and replay technique may allow one operating system, such as the OS1 to use other Operating system's, such as the OS2's data partition even when the other operating system (OS2) is not active where the changes are stored locally and synced to original partition when the operating system OS2 is active.

In one implementation, the request of the applications 214 and 216 to access the data partitions 210-1 and 210-2 of the same operating system 206 is directly sent to the primary file system drivers 224-1 and 224-2 from the file system interface 218-1 and 218-2 of the operating systems 206, respectively. However, in scenarios when the applications request data from the data partition of the other operating system, the file system interface 218 of the operating systems 206 determines the request and forwards it to the secondary file system driver 228. For example, if an application from amongst the OS1 applications 214 sends a request to access a file stored on the OS2 data partition 210-2, the OS1 file system interface 218-1 determines that the request is made to access data partition 210-2, and sends the request to the OS1 secondary file system driver 228-1.

In one implementation, when one of the operating system running on the multi-host computing system, transitions into low power state, such as a hibernate or stand by state, the applications running on other operating system and accessing file system of former operating system would not wait for the operating system to return to an active state. However, any changes made to the files of the file system stored in the data partition of the former operating system are captured and stored in the data partition of the other operating system. In one implementation, these changes are maintained in a journal file and all the file operations are stored in the data partition of the other operating system.

Further, the changes stored on the data partition of the other operating system can be replayed on the file system of the former operating system. For example, in a scenario where OS1 is accessing a file from the OS2 data partition 210-2 and during this process, the OS2 transits into a low power state. Since the OS2 data partition 210-2 is mounted on OS1 in read-only mode, the changes made to the file are stored locally only on the OS1 data partition 210-1. These changes are synchronized with the OS2 data partition 210-2 by the OS2 sync application 222-2, once the operating system OS2 transits back to an active state. Therefore, by utilizing the above mentioned technique, files on OS2 data partition 210-2 can be accessed from OS1 when OS2 is shutdown or is in a low power state.

In one implementation, the locking of files in addition to the file locking provided by the file system or file share servers' is also enabled. For example, if a file is being accessed by an application running on operating system OS1, the OS1 filter driver 220-1 stores this information and writes it to a file on the OS1 data partition 210-1. When OS2 applications 216 on the operating system OS2 request for the same file access, the OS2 secondary file system driver 228-2 of operating system OS2 notifies the OS2 applications. 216 that the file is already locked in operating system OS1.

In said example, the OS2 application 216 may decide to edit the file in spite of lock notification from OS1. These edits, made by the OS2 application 216 are saved in OS2 data partition 210-2. Further, when the OS1 Sync application 222-1 runs on OS1, it may request the user of the OS1 206-1 to resolve the conflict for the edited file by either over writing the changes made by OS2 applications 216 during use or by discarding the changes done by OS2 216. In one implementation, the user of OS1 206-1 may also save the changes made from OS1 applications 214 first, and then allow the OS1 sync application 222-1 to write the changes made by the OS2 applications 216. Yet in another implementation, the file edited can be copied by the OS1 sync application 222-1 and saved with different name without requesting for the permission from the user of the OS1 206-1. However, it would be appreciated by those skilled in the art that request for saving of the file under a different name may be first sent to the user of the OS1 206-1 and upon confirmation, the file may be saved.

In one implementation, applications of the operating systems, such as the primary operating system 206-1 and the secondary operating system 206-2 may encrypt specific files of the native data partition associated with the operating system. For example, the OS1 applications 214 may encrypt certain files of the OS1 native data partition 210-1 or the entire native OS1 data partition 210-1. In said implementation, the OS1 filter driver 220-1 may be a part of the file system of the primary operating system 206-1 and perform the encryption. Further, the OS1 filter driver 220-1 may also maintain a record of files or data partitions encrypted by the applications. It would be understood by those skilled in the art that the encryption can be carried through any known technique and known application, such as truecrypt.

In one implementation the encryption keys may be provided to the secondary operating system 206-2 requesting access to encrypted file or the encrypted data partition through industry standard key exchange mechanisms. The filter driver of the operating system provides the decryption services and makes the data available to applications through the file system of the secondary operating system.

It would be appreciated by those skilled in the art that the sync application 222-1 and 222-2, running on OS1 and OS2 may run as a background service for both the operating systems. Also, in situations when the data being synchronized from one operating system to another is bulky, the sync application of the respective operating system notifies the application miming about the progressing synchronizing in the background. It would also be understood that if applications request to open a file that is being synchronized, the filter driver may not allow any file operations until the synchronization operation is complete.

Further, the sync application of each operating system may utilize different storage space for capturing and storing the changes done to the files stored in the data partition of other operating systems. To optimize the utilization of available memory space, in one implementation, the sync application may synchronize the changes from one data partition to the other data partition after a pre-defined interval, or in another implementation may synchronize the changes after utilization of a pre-defined memory space. Further, in another implementation, the changes may be synchronized based on synchronization rules Where the synchronization rules are further based on host state, memory usage or periodicity.

The method of sync and replay file system sharing utilizing a sync application provides an easy and efficient method of file system sharing between multiple operating systems which may implement different power management schemes. It would be understood that the systems described may also share file systems stored on Universal Serial Bus (USB) mass storage, Compact Disk (CD), and Digital Versatile Disk (DVD) drives using the described file system sharing. The file share server on the operating system that owns these devices can export the file systems on these devices for sharing with the clients.

Further, according to another implementation of the present subject matter, the described multi-host computing system 100 may also be a detachable multi-host computing system which may allow detaching of display from the device itself. When detached, the display may act as an independent computing system with an independent operating system and the remaining device may act as an independent computing system. It may so happen that when the display is attached, both the operating systems of the display and the remaining device may be active and operated as per user's needs. While attached, the files stored on native data partition of other operating systems may be accessed in a manner described before through an inter processor communication bus however, when the display is detached, the operating system of the display may communicate with the remaining device through a wireless network, such as WiFi. In the above described situation, the detached display may share and access files with the remaining device and other computing systems through the wireless network based on server-client architecture switching from the sharing through inter processor communication bus seamlessly. Since the method of file system sharing based on server-client is well known in the art, the details of the same have been omitted for the same of brevity.

Figure 4:
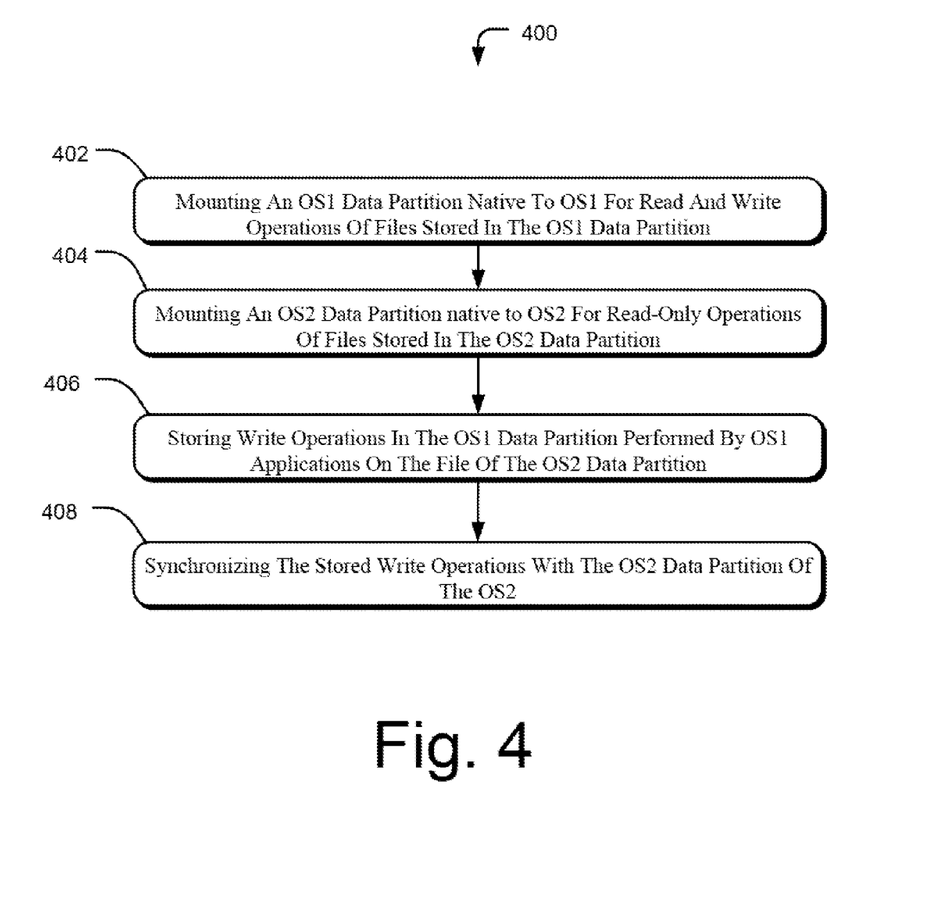
FIG. 4 illustrates a method for file system sharing in a multi-host computing system through synchronization, in accordance with an embodiment of the present subject matter.

FIG. 3 and FIG. 4 illustrates exemplary methods 300 and 400 for implementing file system sharing in a multi-host computing system, in accordance with an implementation of the present subject matter. It would be appreciated that the methods 300 and 400 as described in FIG. 3 and FIG. 4 can be implemented for file system sharing between multiple and different operating systems.

The order in which the method 300 is described is not intended to be construed as a limitation, and any number of the described method blocks can be combined in any order to implement the methods, or alternative methods. Additionally, individual blocks may be deleted from the methods without departing from the spirit and scope of the subject matter described herein. Furthermore, the methods can be implemented in any suitable hardware, software, firmware, or combination thereof.

A person skilled in the art will readily recognize that steps of the method 300 can be performed by programmed computers. Herein, some embodiments are also intended to cover program storage devices, for example, digital data storage media, which are machine or computer readable and encode machine-executable or computer-executable programs of instructions, wherein said instructions perform some or all of the steps of the described methods. The program storage devices may be, for example, digital memories, magnetic storage media, such as a magnetic disks and magnetic tapes, hard drives, or optically readable digital data storage media. The embodiments are also intended to cover both communication network and communication devices configured to perform said steps of the exemplary methods.

Referring to FIG. 3, at block 302, an access request from applications running on OS1 to access a file stored on data partition of OS2 is received. In one implementation, the request may be a read request however, in another implementation the request may be a write request.

At block 304, the OS1 requests the operational status of OS2. In other words, the state of the OS2 is determined. It would be appreciated by those skilled in the art that the operational state of an operating system may vary and the state might be same or different for different operating systems running on the multi-host computing system. For example, the operational state of OS2 may be active, where the operating system is running. However, the OS2 can be in a low power state such as hibernate or standby state.

At block 306, it is determined whether or not the OS2 is in active state. The state of OS2 can either be an active state or a low power state. Upon determination of a low power state of OS2, the flow transitions to block 308 ("No" branch). However, if it is determined that the OS2 is in active state, the flow transitions to block 310 ("Yes" branch).

At block 308, the OS1 sends a request to activate OS2. In one embodiment, such request may be sent as a request similar to a hardware request to wake-up an operating system from low power state to an active state. Upon receiving such a request, the OS2 may transition from the low power state to an active state. It would be appreciated by those skilled in the art that the OS2 would be pre-configured to receive such requests, as sent by the OS1 and would transition from low power state to the active state.

At block 310, the OS1 sends file access request to OS2 through file redirection engine. The flow in which the request is sent from the 081 to OS2 has been explained in FIG. 1 and therefore, the details of the same have been omitted for the sake of brevity. Upon receiving such a request, the OS2 may retrieve the file locally, in its local cache. To receive the file from OS2, the OS1 acts as a file client whereas the OS2 acts as file server.

At block 312, for the file retrieved by the OS2, the file handle is received by the OS1. In one embodiment, the file handle of the file is also communicated from OS2 to OS1 via the high speed IPC bus FiRE.

At block 314, the OS1 performs read-write functions operations on the file. The read-write operations done by the OS1 on the file are communicated to the OS1 through the FiRE. The changes received by the OS2 file server are then made to the actual file stored in the data partition of OS2.

Referring to FIG. 4, at block 402, an OS1 data partition native to OS1 is mounted for read and write operations of files stored in the OS1 data partition. In one implementation, a multi-host computing system may include multiple operating systems configured to run different application. In said implementation, the OS1 and OS2 may be run on the multi host computing system 200.

At block 404, an OS2 data partition native to OS2 is mounted by the OS1 for read-only operations of files stored in the OS2 data partition. In one implementation, the OS2 may be in low power mode, where the OS2 data partition is not mounted by the OS2. In such a scenario, the OS2 data partition may include certain files that the OS1 may wish to access. By mounting the OS2 data partition in read only mode, the OS1 may be able to read the files stored on the OS2 data partition without requesting access from the OS2.

In another implementation, the OS2 may be in active state where it may mount the OS2 data partition for read and write operations. Still, in such a scenario, the OS2 data partition mount by the OS1 may allow the access of file stored in the OS2 data partition in read only mode.

At block 406, write operations performed by OS1 applications on the file stored on the OS2 data partition may be stored in the OS1 data partition. In one implementation, the write operations performed by the OS1 applications may be modifications to the existing data, or may include addition of data to the presently stored data in the file.

At block 408, the stored write operations performed by the OS1 are synchronized with the OS2 data partition of the OS2. In one implementation, the synchronization is performed by a sync application of the OS1. In situations where the OS2 may be in low power state, the synchronization may be done when the OS2 resumes into an active state. However, in situations where the OS2 is in active state, the OS2 sync application may directly synchronize the write operations performed by the OS1 application to the OS2 data partition. In another implementation, the sync application of the OS1 may be configured to synchronize the write operations after every pre-defined time intervals.

Although implementations for file system sharing in a multi-host computing system have been described in language specific to structural features and/or methods, it is to be understood that the description is not necessarily limited to the specific features or methods described. Rather, the specific features and methods are disclosed as exemplary implementations for file system sharing in multi-host computing systems.

We claim:

1. A method for file system sharing in a multi-host computing system, the multi-host computing system comprising a plurality of processors, a plurality of operating systems, and a dedicated File Redirection Engine (FiRE), wherein each processor from amongst the plurality of processors runs an operating system from amongst the plurality of operating systems and at least two processors from amongst the plurality of processors are coupled through the FiRE, the method comprising:

receiving, by the FiRE, an access request from a primary operating system from amongst the plurality of operating systems, the access request being indicative of a request to access a file stored in a native data partition of the secondary operating system, wherein the multi-host computing system comprises a storage device to store a plurality of native data partitions and each operating system has a corresponding native data partition in the storage device for accessing files stored in the native data partition, and wherein the FiRE is a hardware communication bus between the at least two processors to provide lossless communication;

obtaining, by the FiRE, a power state transition request from the primary operating system, for a secondary operating system from amongst the plurality of operating systems, wherein the secondary operating system is in a low power state, and wherein the power state transition request is to transit the secondary operating system to an active power state;

sending, by the FiRE, the power state transition request to the secondary operating system for transitioning the secondary operating system into the active power state;

providing, by the FiRE, the access request to the secondary operating system;

receiving, by the FiRE, file handles associated with the file from the secondary operating system;

providing, by the FiRE, the file handles associated with the file to the primary operating system for performing read and write operations on the file; and communicating, by the FiRE, the read and write operations performed by the primary operating system on the file, to the secondary operating system, wherein the secondary operating system updates the file, based on the read and write operations;

receiving, by the primary operating system, information regarding transitioning of the secondary operating system into a low power state through the FiRE; and mounting, by the primary operating system, the native data partition of the secondary operating system in a read-write mode to access the native data partition and perform changes to the file by utilizing the file handles, wherein the secondary operating system is in a low power state, and wherein the primary operating system directly accesses the native data partition of the secondary operating system in the storage device through a virtualization enabled host controller, the virtualization enabled host controller being a hardware platform to allow simultaneous access of the storage device to the plurality of operating systems.

2. The method as claimed in claim 1, wherein the primary operating system comprises a native boot partition.

3. The method as claimed in claim 1, wherein the native data partition of each of the plurality of operating systems is one of a File Allocation Table (FAT), a FAT 12, a FAT 16, a FAT 32, a New Technology File System (NTFS), a Hierarchical File System (HFS), a High Performance File System (HPFS), a Second Extended File System (ext2), a Third Extended File System (Ext3), and an Universal Disk Format (UDF).

4. The method as claimed in claim 1 is based on server-client architecture of file sharing, wherein the primary operating system, from amongst the plurality of operating systems, that generates an access request is a client, and wherein the secondary operating system from amongst the plurality of operating systems that receives the access request is a server.

5. The method as claimed in claim 1, wherein the file is stored on a storage device comprising one of Advance Technology Attachment (ATA) storage device, Serial Advance Technology Attachment (SATA) storage device, internal Small Computer System Interface (iSCSI) storage device, Universal Serial Bus (USB) storage device, NAND storage device, e-Multi Media Card (e-MMC) storage device, Compact Disk (CD) storage device, DVD storage device, and memory cards.

6. A multi-host computing system for file system sharing, the multi-host computing system comprising:

a dedicated inter processor communication bus, FiRE, wherein the FiRE is a hardware communication bus;

at least one primary operating system, running on a primary processor, a secondary operating system, running on a secondary processor, wherein the primary processor and the secondary processor are coupled through the FiRE, and wherein the FiRE is to provide lossless communication between the primary processor and the secondary processor;

the primary operating system comprising:
an Operating System (OS1) file system interface configured to receive an access request from the secondary operating system through the FiRE, wherein the access request is indicative of a request to access a file stored in a native OS1 data partition associated with the primary operating system, wherein the multi-host computing system comprises a storage device to store a plurality of native data partitions, and each operating system has a corresponding native data partition in the storage device for accessing files stored in the corresponding native data partition;

an OS1 file system driver configured to retrieve a file from the native OS1 data partition based on the received access request; and an OS1 File Redirection Engine (FiRE) driver configured to:
provide file handles associated with the file to the secondary operating system through the FiRE, for the secondary operating system to perform read and write operations on the file stored in the native OS1 data partition of the primary operating system;

communicate the read and write operations, performed by secondary operating system on the file in the native OS1 data partition to the primary operating system, wherein the primary operating system updates the file, based on the read and write operations; and provide information regarding transitioning of the primary operating system into a low power state, to the secondary operating system, wherein the secondary operating system, upon receiving the information, accesses the native OS1 data partition of the primary operating system by utilizing the file handles and performs changes to the file of the native OS1 data partition, wherein the primary operating system is in a low power state and the changes are directly stored on the native OS1 data partition by the secondary operating system, and wherein the secondary operating system accesses the native OS1 data partition in the storage device through a virtualization enabled host controller.

7. The multi-host computing system as claimed in claim 6, the OS1 file system driver is further configured to provide a native OS1 boot partition.

8. The multi-host computing system as claimed in claim 6, the OS1 file system interface is further configured to receive a power state transition request from the secondary operating system when the primary operating system is in a low power state.

9. The multi-host computing system as claimed in claim 6, wherein the OS1 file system driver is configured to:
mount the native OS1 data partition while transitioning to an active power state from the low power state for read and write operations; and
receive file handles of open files on the native OS1 data partition from the secondary operating system upon transitioning to the active power state.

10. The multi-host computing system as claimed in claim 6, wherein the OS1 FiRE driver is configured to provide the file handles to the secondary operating system based on a server-client architecture.

11. The multi-host computing system as claimed in claim 6, wherein the primary operating system and the secondary operating system are further configured to seamlessly share files through a wireless network.

12. The multi-host computing system as claimed in claim 6, further comprising OS1 applications, wherein the OS1 applications are configured to encrypt at least one of a file stored on the native OS1 data partition of the primary operating system.

13. The multi-host computing system as claimed in claim 12, wherein the OS1 FiRE driver is further configured to provide an encryption key associated with an encrypted file to the secondary operating system through the dedicated inter processor communication bus, FiRE in response to the access request of the encrypted file.

* * * * *